June 26, 1951  T. T. PUREKA  2,557,999
DEVICE FOR GENERATING PARABOLIC CURVES
Filed June 6, 1950  4 Sheets-Sheet 1

INVENTOR.
THOMAS T. PUREKA
BY Wade Comely
Frederick W. Cottlepman
ATTORNEYS

June 26, 1951 T. T. PUREKA 2,557,999
DEVICE FOR GENERATING PARABOLIC CURVES
Filed June 6, 1950 4 Sheets-Sheet 2

INVENTOR.
THOMAS T. PUREKA
BY Wade Kountz AND
Frederick W. Cottman
ATTORNEYS

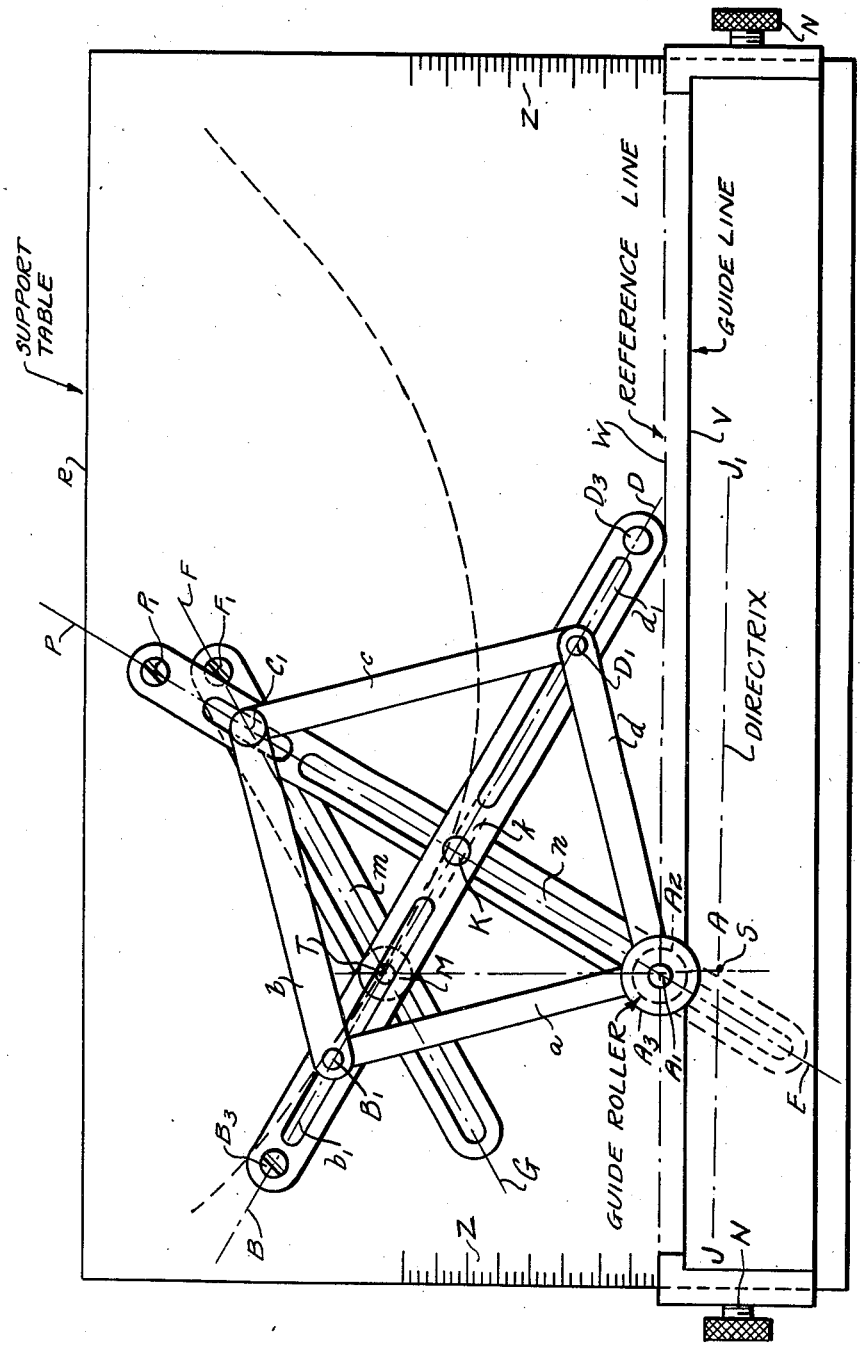

June 26, 1951  T. T. PUREKA  2,557,999
DEVICE FOR GENERATING PARABOLIC CURVES
Filed June 6, 1950  4 Sheets-Sheet 4

INVENTOR.
THOMAS T. PUREKA
BY Wade Koontz AND
Frederick W. Cotterman
ATTORNEYS

Patented June 26, 1951

2,557,999

UNITED STATES PATENT OFFICE 2,557,999

DEVICE FOR GENERATING PARABOLIC CURVES

Thomas T. Pureka, Lynn, Mass.

Application June 6, 1950, Serial No. 166,521

3 Claims. (Cl. 33—27)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to a device for quickly and accurately generating a parabolic curve, and is particularly adapted for scribing such a curve on a plane surface.

A parabolic curve is one wherein any selected point on the curve is equidistant from the focus and the directrix, and wherein the directrix is a straight line normal to the axis of symmetry and lies outside the curve, the focus is a point lying on the axis of symmetry inside the curve, and the vertex is a point on the axis of symmetry midway between the directrix and the focus.

The herein disclosed invention consists of a mechanical linkage, the parts of which are so made and joined together that when one point is made to follow a reference line parallel to the line of the directrix, another point will trace a true parabolic curve. This mechanical linkage is shown in and described with reference to the drawings, wherein:

Figs. 3 and 4 are front and side views respectively of the complete device.

Figure 6:
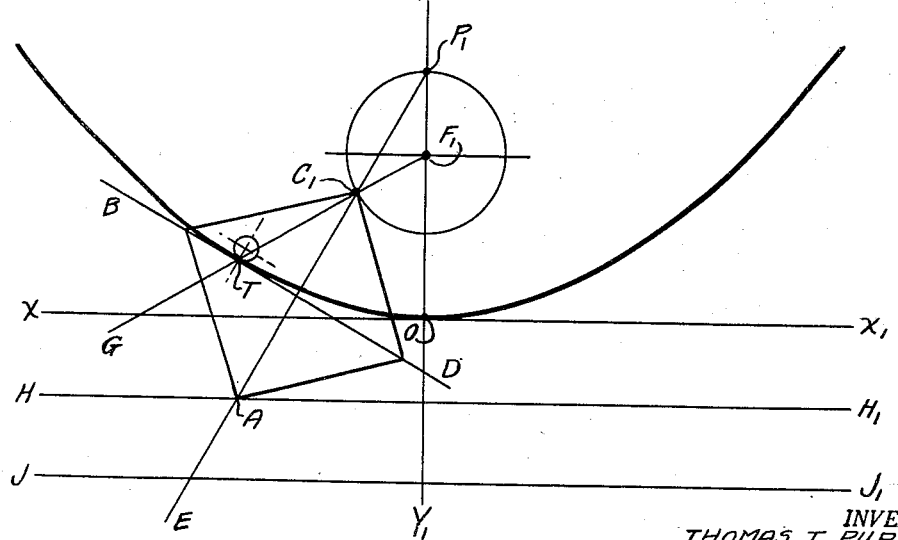

Fig. 6 discloses a method by which the device hereinbefore shown may be adapted to cut parabolic curves.

Like reference characters refer to like parts throughout the several views.

Figure 1:
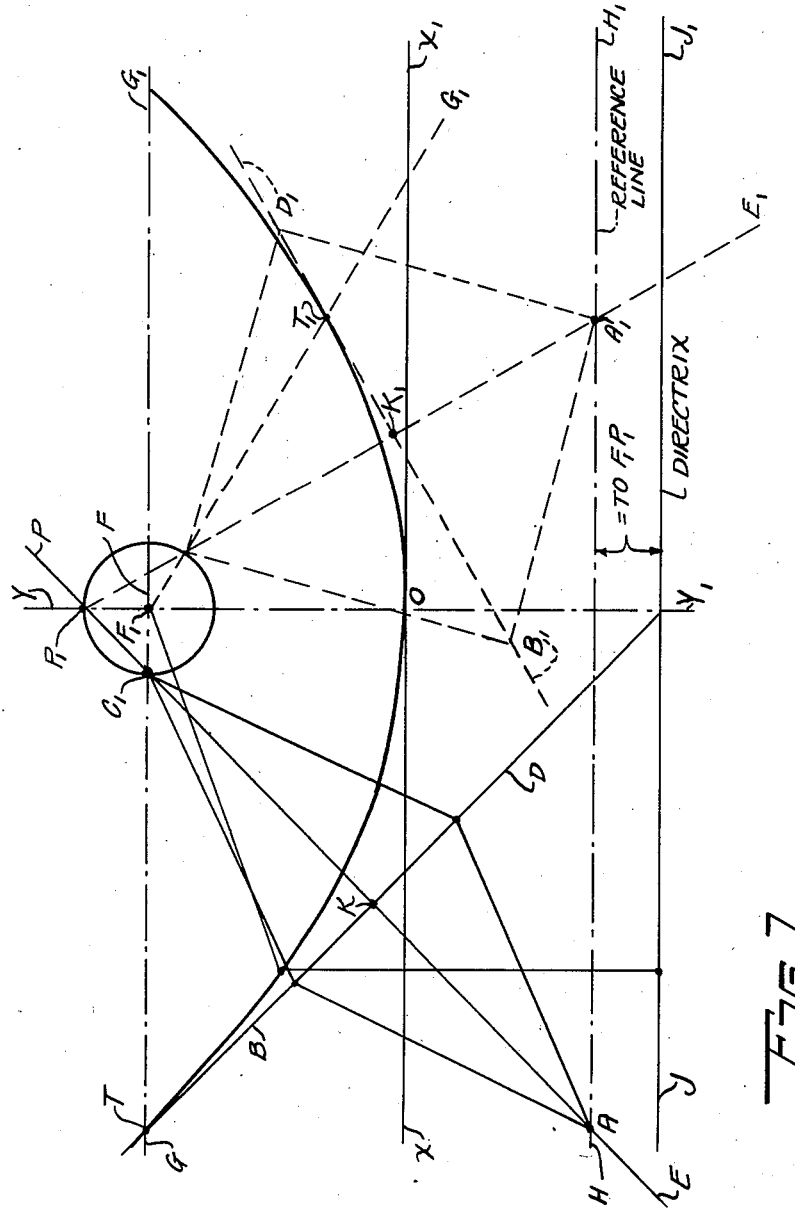
Fig. 1 is a diagrammatic view showing the geometric principles on which the device is based.

Referring to the drawings and particularly to Fig. 1, two linkages are involved, the first to impart the necessary ratio of angular movement of line PE about point $P_1$, to line FG about point $F_1$, and the second to maintain a line BD always normal to PE and always tangent to the parabola as at T, $T_1$, Fig. 1, etc. (see Fig. 1), as the arms move. A full line view and a dot and dash view both in Fig. 1, each shows two linkages diagrammatically.

In the diagram Fig. 1, parallel lines $GG_1$, $XX_1$, $HH_1$ and $JJ_1$ are normal to the axis of symmetry $YY_1$ and the intersections of these parallel lines with this axis of symmetry delineate the focus F, vertex O, reference line and directrix respectively. Lines $GG_1$ and $JJ_1$ are on opposite sides of and equidistant from the line $XX_1$, and lines $HH_1$ and $JJ_1$ are spaced apart a distance equal to $P_1F_1$.

Figure 2:
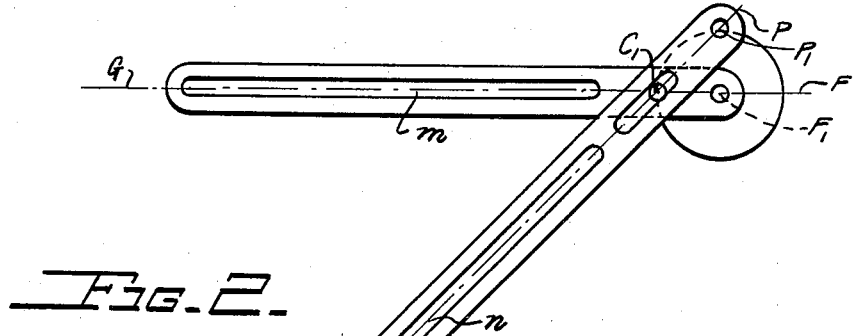
Fig. 2 is a full line view of the main linkage.

In Fig. 2 the main linkage which is used to interpret geometric theorem: An inscribed angle is measured by one-half the intercepted arc, and which corresponds to the lines PE and FG or $P_1E_1$ and $F_1G_1$ of Fig. 1, is shown in detail. In it the arms PE and FG are adapted to be hinged to a stationary element R of the device (see Fig. 3) by studs centered at $P_1$ and $F_1$ respectively, and a stud $C_1$ is fixed in the arm FG at a distance from $F_1$ equal to $P_1F_1$. The arm PE is slotted to slidably receive the stud $C_1$, the center of the radius of the upper end of the slot being at a distance not more than $P_1F_1$ from $P_1$, and at the lower end at not less than $2(P_1F_1)$ from $P_1$. The remaining portions of the arms are slotted through as at m and n for purposes later to be described.

Figure 4:
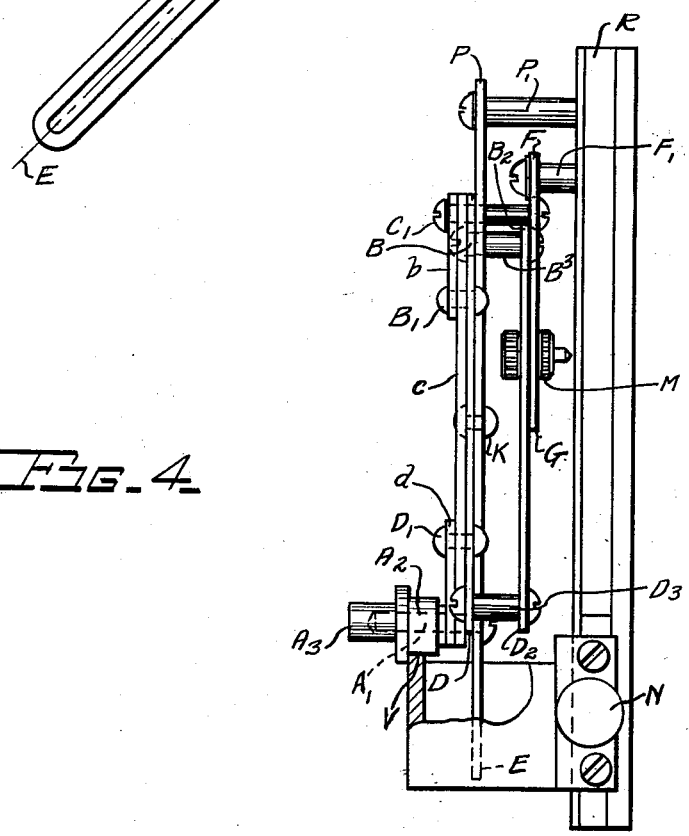

In Figs. 3 and 4, the arms PE and FG are hinged by studs $P_1$ and $F_1$ respectively to the supporting plate R. Thus arranged, when the arm PE is swung about the pivot $P_1$ a given angular distance, the arm FG will be swung about the point $F_1$ through twice the given angular distance.

Also in Figs. 3 and 4, a tangent bar BD is kept normal to PE by a series of links a, b, c and d hinged together by studs $A_1$, $B_1$, $C_1$ and $D_1$. The stud $C_1$ is fixed in the arm FG as explained relative to Fig. 2, and the stud $A_1$ is slidable in the slot n of the arm PE, while the studs $B_1$ and $D_1$ are slidable in slots $b_1$ and $d_1$ which extend from end to end of the tangent bar BD except for an interrupted portion k midway of its length at which point a stud K is fixed in the bar BD but slidable in the slot n, whereby any movement of the stud $A_1$ toward $C_1$ widens the distance between the studs $B_1$ and $D_1$ and the tangent bar BD remains always normal to PE.

A second bar $B_2D_2$ (see Fig. 4) is substantially like the bar BD except that this second bar is slotted from end to end, i. e., the slot does not have the interruption k midway of the length. This second bar $B_2D_2$ is fastened in spaced apart relation to BD by studs $B_3$ and $D_3$ and provides an uninterrupted sliding track for a scriber M which is also slidable in the slot m of the arm FG.

The stud $A_1$ carries a roller $A_2$ which is rollable on a guide member V, which is so spaced that the center of the roller follows the reference line W, Fig. 3. The reference line W is at a distance $P_1F_1$ from the directrix.

The guide member which carries the roller guide V may be raised or lowered along the graduations Z, Fig. 3, and fastened with thumbscrews N for scribing parabolas of different focal lengths.

Figure 5:
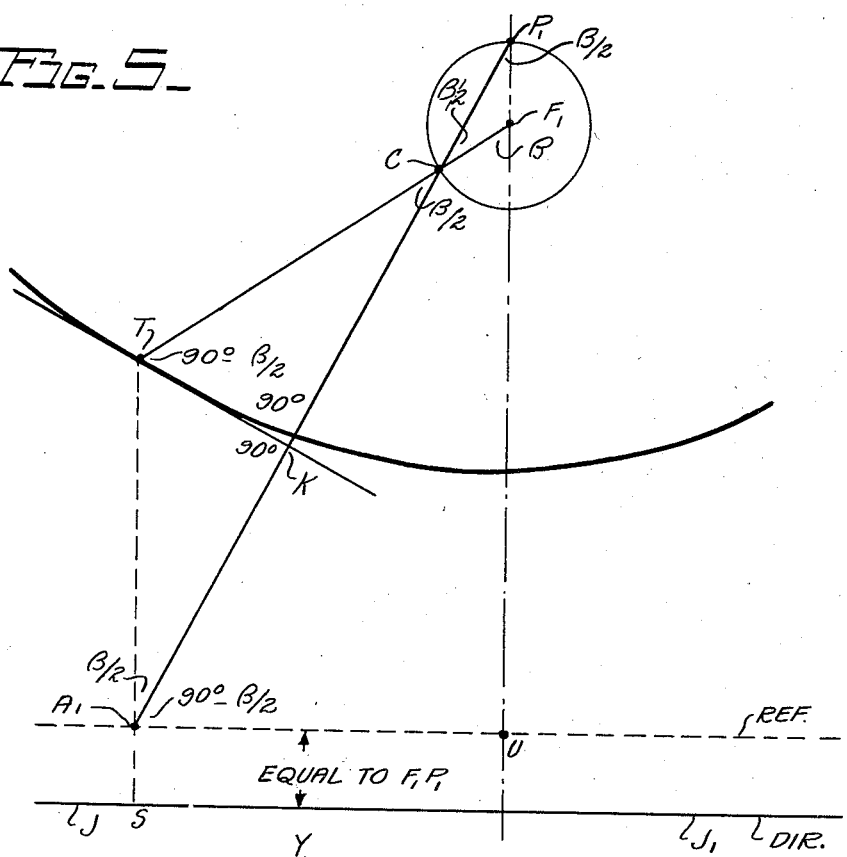
Fig. 5 is a geometric proof that the curve drawn by the device is a true parabola.

The operation of the device may preferably be carried out substantially as follows:

With the guide member V, Fig. 3, set for the desired focal length, the roller $A_2$ is drawn along the guide V manually by thumb and finger hold on the knob $A_3$ on the stud $A_1$. As the roller $A_2$ rolls along on the guide line V, the scriber M will scribe a true parabola. Proof that the figure drawn is a true parabola is made in Fig. 5.

To prove that the perpendicular distance from any point T on the curve to the directrix $JJ_1$ is equal to the distance of the same point T from the focus $F_1$, (1) Draw line $TA_1S$ through points $T$ and $A_1$;
(2) $KC = A_1K$ (by construction of the device)
    $TK = TK$ (by construction of the device);
(3) $\therefore \triangle KCT$ is congruent to $\triangle KA_1T$ and their angles are equal, so that $\angle KA_1T = \frac{B}{2}$;
(4) $\angle P_1UA_1 = 90°$
    $\therefore \angle P_1A_1U = 90° - \frac{B}{2}$;
(5) $\angle KA_1T + \angle P_1A_1U = 90°$
    $\therefore$ line $TA_1S$ is perpendicular to the reference line and also to the directrix which is parallel to the reference line;
(6) $A_1S = F_1P_1$;
(7) Since $\triangle KCT$ is congruent to $\triangle KA_1T$, $A_1T = TC$;
(8) Line $TF_1 = TC + CF_1$, and line $TS = TA_1 + A_1S$;
    $\therefore$ since $TC = A_1T$ and $A_1S = P_1F_1 = CF_1$; line $TS$ = line $TF_1$.

The foregoing proves the requirement for scribing a parabola. Where it is desired to actually cut the parabolic curve, a structure modified as shown diagrammatically in Fig. 6 is provided.

Fig. 6 illustrates the method of offsetting a cutter to directly cut the parabolic curve in sheet materials.

The cutter is offset perpendicular to the tangent bar (BD) at the generating point (T).

In a machine the cutter and a motor (not shown) for rotating the cutter would be attached to a floating carriage which would follow the tangent bar and arm (FG).

Having described an embodiment of my invention, I claim:

1. A device for delineating a parabolic curve which comprises, in combination, a supporting member, spaced apart pivot means on said supporting member, an operating arm having one end pivoted on one of said pivot means, an operated arm having one end pivoted on the other of said pivot means, means connecting the two said arms near the pivot means whereby swinging the operating arm about its pivot means through a given angle swings the operated arm about its pivot means through twice the given angle, a tangent bar carried by the operating arm, linkage for sliding the tangent bar longitudinally of the operating arm while maintaining the tangent bar at all times normal to the operating arm, a second tangent bar attached to and in congruity with the first tangent bar, scriber means arranged to slide freely longitudinally along said second tangent bar and along said operated arm, and a linkage-controlling reference line member as far above the directrix of the parabola as the two pivot means are spaced apart.

2. A device for delineating a parabolic curve which comprises, in combination, a supporting member, two pivoting means having axes normal to the plane of the curve spaced apart one above the other, a manually swingable operating arm having one end pivoted on the upper one of the two pivoting means, an operating arm having one end swingable on the lower one of said pivoting means, a third pivoting means carried by said operated arm fixed thereon at the same distance from the lower one of the two said pivoting means as the distance between the said upper and the said lower pivoting means, said operating arm being slotted longitudinally for said third pivoting means, whereby swinging the operating arm about its pivot means through a given angle swings the operated arm about its pivot means through twice the given angle, a tangent bar slidable longitudinally on said operating bar, four links of equal length hinged together at their ends in quadrilateral pattern, one hinge being coincident with said third pivoting means, a diagonally opposite hinge being slidable longitudinally along said operating arm, the other hinge points being slidable longitudinally along said tangent bar, a second tangent bar attached to and in congruity with the first tangent bar, parabola delieneating means arranged to slide longitudinally along said tangent bar and longitudinally along said operated arm, and a linkage-controlling guide member for maintaining the axis of said diagonally opposite hinge spaced from the directrix of the parabola as far as the spacing between the two first said pivots.

3. A device as recited in claim 2 and including means adjustably mounting said guide member on said supporting member, and indicia on said supporting member for indicating the relative position of said guide member with respect to said supporting member.

THOMAS T. PUREKA.

REFERENCES CITED

The following references are of record in the file of this patent:

FOREIGN PATENTS

| Number | Country | Date |
|---|---|---|
| 535,215 | France | Jan. 20, 1922 |

OTHER REFERENCES

Campbell: "A New Conicograph," Trans., Am. Soc. M. E., vol. 8, pages 145-154 (TJI.A7).